(No Model.) 7 Sheets—Sheet 3.
C. D. GALVIN.
APPARATUS FOR PLACER MINING, &c.

No. 578,816. Patented Mar. 16, 1897.

(No Model.) 7 Sheets—Sheet 4.

C. D. GALVIN.
APPARATUS FOR PLACER MINING, &c.

No. 578,816. Patented Mar. 16, 1897.

Witnesses:
J. Halpenny
Fred Gerlach

Inventor:
C. D. Galvin
By Peirce & Fisher
His attys

(No Model.) 7 Sheets—Sheet 5.

C. D. GALVIN.
APPARATUS FOR PLACER MINING, &c.

No. 578,816. Patented Mar. 16, 1897.

Witnesses
J. Halpenny
Fred Gerlach

Inventor:
C. D. Galvin
By Pierce & Fisher
His Attys.

(No Model.) 7 Sheets—Sheet 7.

C. D. GALVIN.
APPARATUS FOR PLACER MINING, &c.

No. 578,816. Patented Mar. 16, 1897.

FIG.18

Witnesses:
J. Halpenny
Fred Gerland

Inventor:
C. D. Galvin
By Peirce & Fisher
His attys.

United States Patent Office.

CARROLL D. GALVIN, OF CHICAGO, ILLINOIS.

APPARATUS FOR PLACER-MINING, &c.

SPECIFICATION forming part of Letters Patent No. 578,816, dated March 16, 1897.

Application filed April 29, 1896. Serial No. 589,489. (No model.)

*To all whom it may concern:*

Be it known that I, CARROLL D. GALVIN, a citizen of the United States, and a resident of the city of Chicago, in the county of Cook and State of Illinois, have invented certain new and useful Improvements in Apparatus for Placer-Mining or other Purposes, of which I do declare the following to be a full, clear, and exact description, reference being had to the accompanying drawings, forming a part of this specification.

In placer-mining operations the desideratum of some practical and effective apparatus by which the earth containing the precious metal might be excavated upon a large scale has long been recognized. One serious objection to the methods and apparatus heretofore employed in placer-mining has been the difficulty of economically disposing of the tailings or refuse without discharging the same into rivers or water-courses, the channels of which must thereby be soon materially affected. Indeed in certain of the Western States of this country laws have been enacted prohibiting the discharge of such tailings or refuse into rivers or streams.

The primary object of my present invention is to provide a simple and effective apparatus whereby placer-mining operations can be conducted upon an extensive scale and whereby the tailings or refuse may be economically and rapidly disposed of in such manner that they need not be delivered into the adjacent rivers or streams.

With this object in view my invention consists in the improvements hereinafter set forth, reference being had to the accompanying drawings, forming a part of this specification, and particularly defined in the various claims at the end of this description. I wish it distinctly understood, however, that while my invention is thus primarily directed to the improvement of apparatus for conducting placer-mining operations, features of the invention will be found applicable for other purposes, and I do not, therefore, wish the invention to be understood as limited to such specific purpose.

Figure 1:
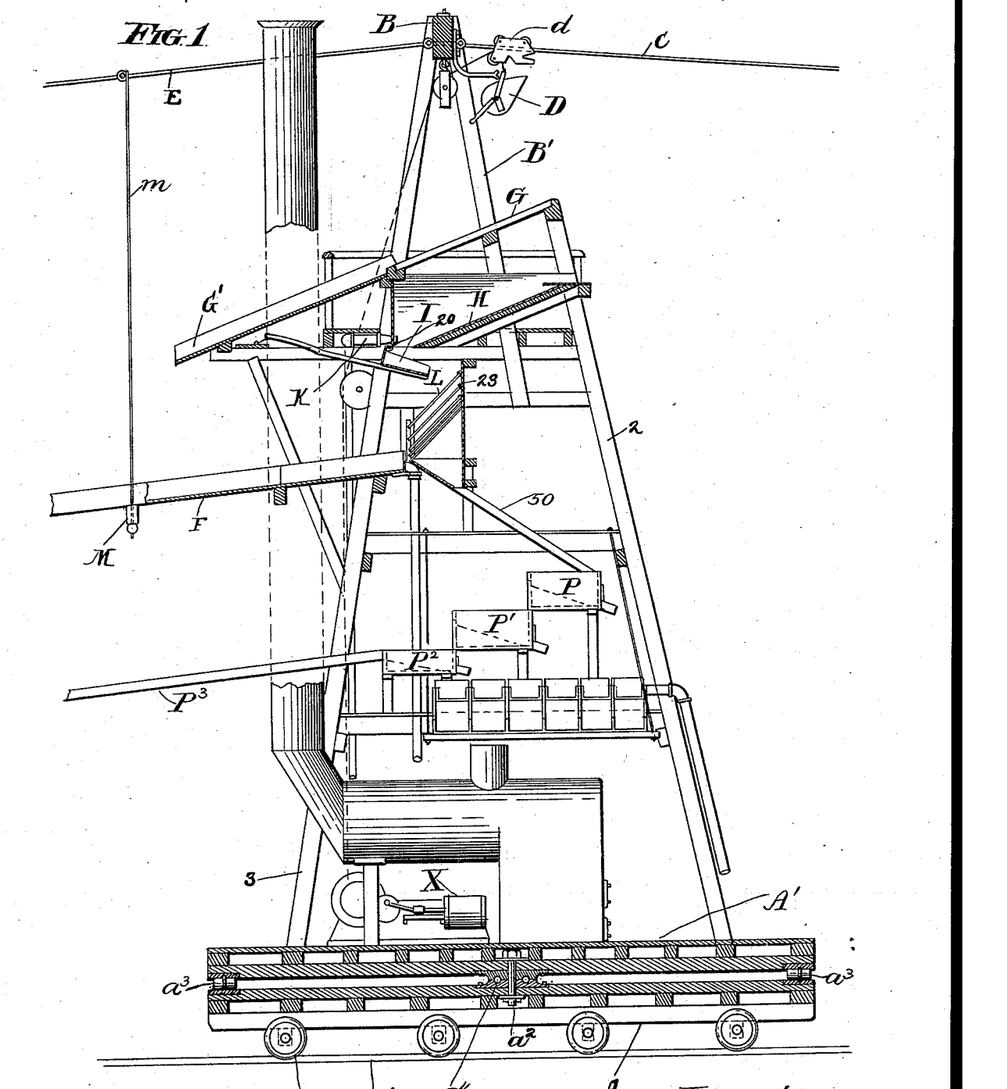
Figure 1 is a view in side elevation (parts being shown in section) of the engine-tower and certain of its connections.
Figure 2:
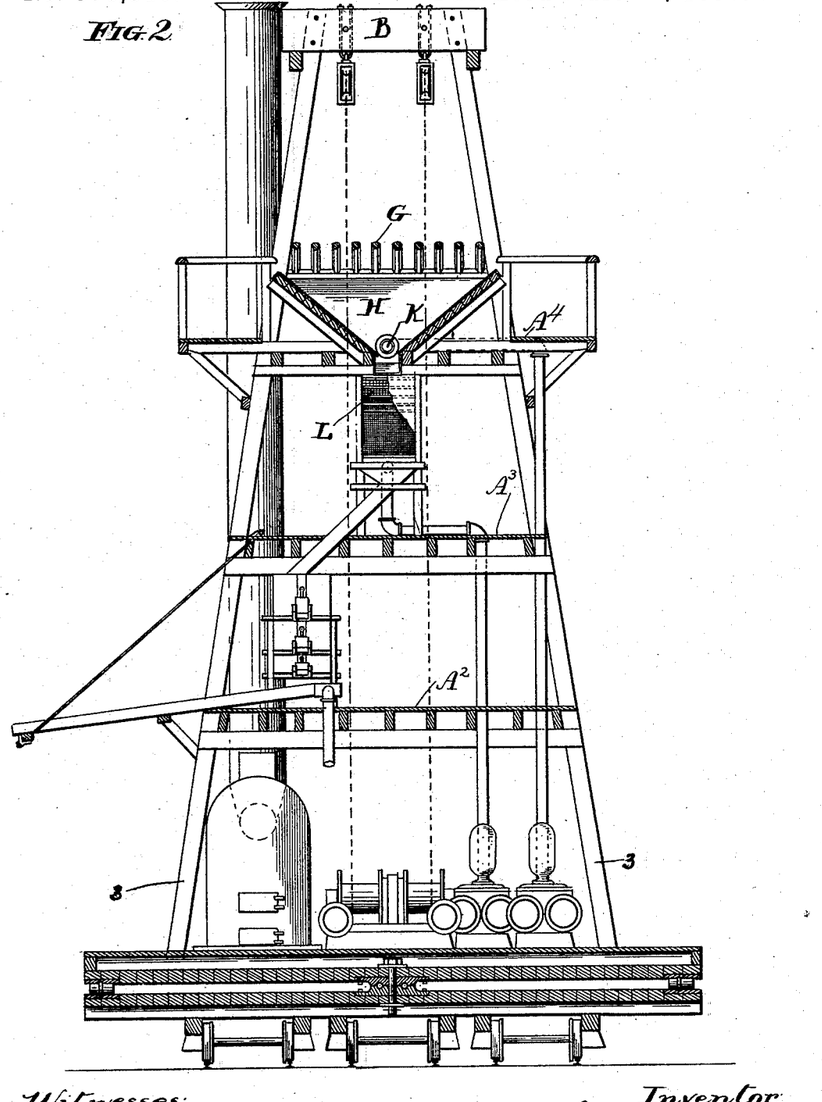
Fig. 2 is a view in vertical section through the tower, this section being taken at one side of the center.

The tower that is used to carry out my invention consists, preferably, of a base portion A, that is mounted upon wheels $a$, adapted to travel upon the rails $a'$. The body of the tower is revolubly connected to its base A, preferably by means of a central pin or journal $a^2$, and this body rests upon suitable rollers or bearings $a^3$ and $a^4$, interposed between suitable rails or bearing-plates mounted, respectively, upon the base A and the lower part of the structure above it. The purpose in thus revolubly mounting the body of the tower is to enable it to be turned from time to time as the direction of the cableways leading therefrom is varied, as will presently more fully appear. From the lower part A' of the tower rise the corner-posts 2 and 3, that will be connected together, in manner well understood, by cross-beams, and preferably the tower is divided by the several floors $A^2$, $A^3$, and $A^4$. The corner-posts 3 (see Figs. 1 and 2) of the tower are shown as extending from the lower floor A' to the top beam B, to which they are bolted, but the corner-posts 2 at the opposite side of the tower (see Fig. 1) are shown as somewhat shorter, and from the upper part of the tower and conveniently connected to suitable cross-beams rise the stay-posts B', the upper ends of which are connected to and aid in supporting the cross-beam B.

I do not deem it necessary to enter into any detailed description of the manner of constructing the framework of the tower, since this will be readily understood by those familiar with this class of apparatus.

By reference to Figs. 1 and 2 and Figs. 15 and 18 of the drawings it will be seen that from the cross-beam B at the top of the tower extend the cableways or track-cables C and C', these cables C and C' forming ways or tracks that support the carriages $d$, whereby the shovels D are transferred to and from the tower. The cableways C and C' extend over suitable supports or A-frames 4, erected on the embankment, and thence around suitable sheaves or rollers 5, these sheaves or rollers 5 being connected by the blocks and tackle 6 to suitable guys or anchors 7. The ends of the cableways C and C', after being thus passed around the sheaves 5, are preferably connected together by a block-and-tackle system 8. By reference to Fig. 18 of the drawings it will be seen that the ends of the cableways C and C' are loose, but these cableways are united to the block-and-tackle mechanism 8 by means of suitable adjustable clamps or grips 9, the specific construction of which forms no part of my present invention and need not therefore be more specifically described, since any suitable type of adjustable clamp or grip may be employed.

To each of the shovels D is connected a working cable D', one end of which leads in the usual manner to the hoisting-drum of the engine X at the tower, while the opposite end of this working cable passes around a sheave on the carriage $d$, and thence down and around a sheave in the bail of the shovel D, and thence up to the carriage $d$, to which the end of this working cable will be fastened. The manner of thus connecting a working cable of a shovel is well understood in the art and the mode of operation need not be specifically set forth. To the carriage $d$ is also connected in the usual manner a return-cable $D^2$, that leads to a series of pulleys and counterweight mechanism $D^3$, this counterweight mechanism serving to return the empty shovels to the field of work.

From the opposite side of the cross-beam B at the top of the tower extend the sluice-cables E and E', (see Fig. 18,) these cables diverging, as shown, from the tower and passing over A-frames or supports 10, and thence around sheaves 11 to block-and-tackle mechanism 12, to which they are connected by suitable adjustable clamps 13 in the same manner as the cables C and C' are connected to the block-and-tackle mechanism that unites their ends. The sheaves 11, around which the sluice-cables E and E' pass, are united by blocks and tackles 14 to suitable anchors 15, as clearly shown in Figs. 15 to 18 of the drawings. By reference more particularly to Figs. 1, 7, 8, and 9, and 15 to 18 of the drawings it will be seen that the cables E and E' serve to support the sluiceways F, that are formed of a series of detachable sections, the construction of which will be hereinafter more specifically set forth.

I will next describe my improved method of excavation and manner of disposing of the tailings, for which the apparatus shown is especially adapted, and will then proceed to a detailed description of such apparatus.

Figure 15:
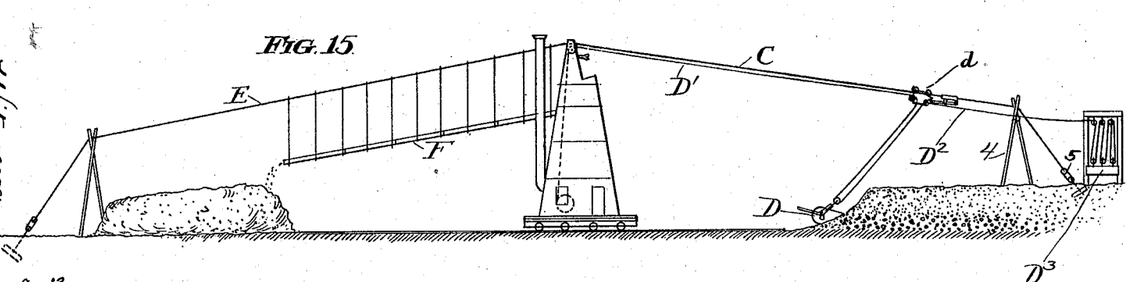
Fig. 15 is a diagrammatic view in side elevation showing the general arrangement of the apparatus.
Figure 16:
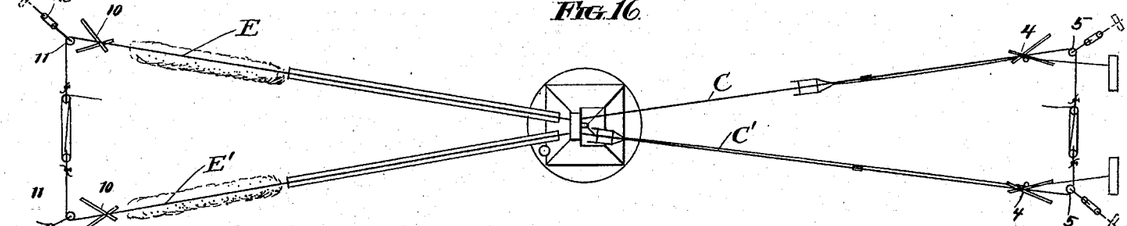
Fig. 16 is a plan view of the arrangement shown in Fig. 15.
Figure 17:
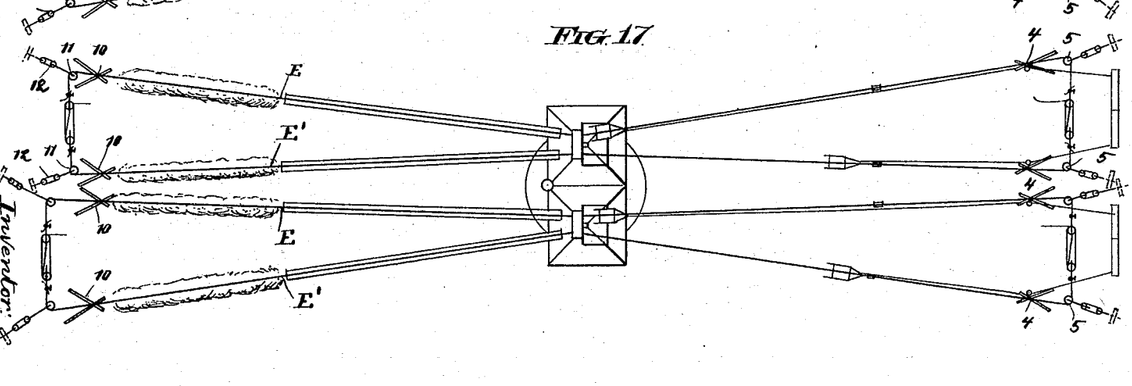
Fig. 17 is a plan view similar to Fig. 16, but showing how the system may be worked in duplicate.
Figure 18:
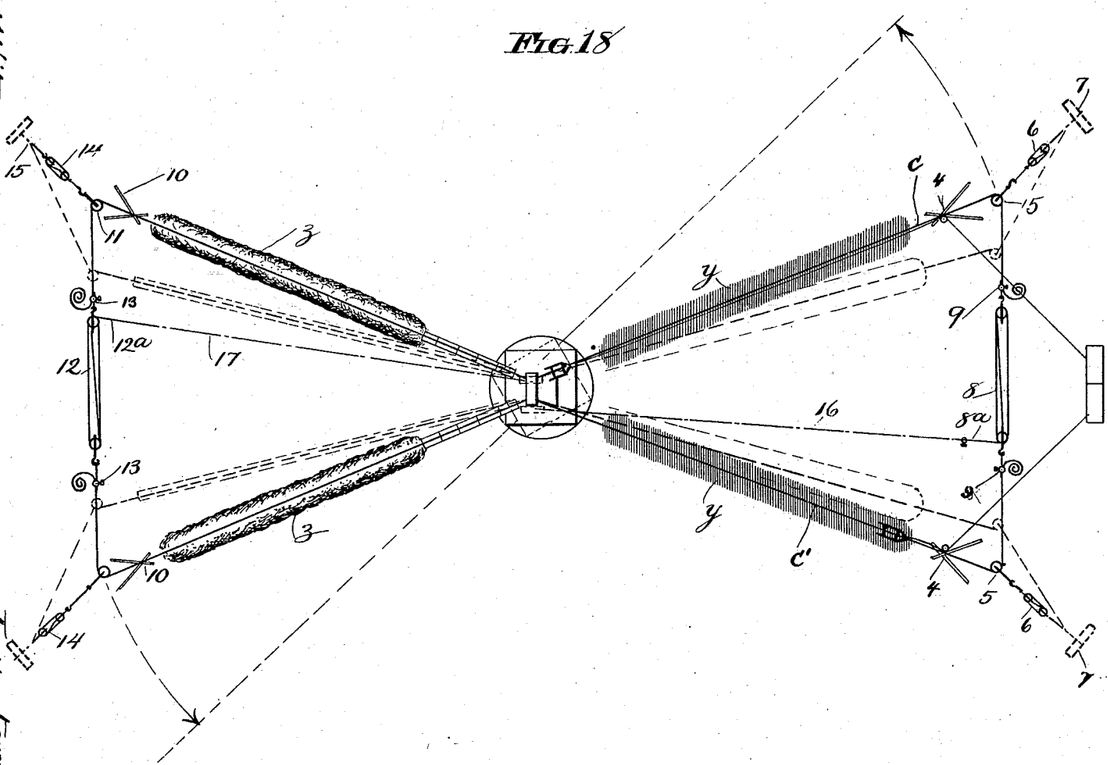
Fig. 18 is a plan view similar to Fig. 16, but upon an enlarged scale.

At the beginning of the operation the cableways C and C' and the sluice-cables E and E' will be extended in opposite directions, as indicated in Figs. 15, 16, and 18 of the drawings. The shovels D will then be used to excavate and convey the earth from points beneath the cableways, beginning adjacent the tower, and as the excavation proceeds the refuse material or tailings will (in manner hereinafter described) be delivered at the opposite side of the tower into the sluiceways F F', and down these sluiceways the tailings will be caused to pass to the points of discharge by means of a small stream of water, &c. It will be understood, of course, that one of the shovels D will be delivering earth to the tower while the other shovel D is receiving its load. At the beginning of the operation the sluiceways F F' will be extended to their greatest length along the sluice-cables E and E', and at such time the discharge of tailings or refuse will occur at points most remote from the tower. As soon as the pile of tailings or refuse reaches the end of the sluiceways F F' the outer sections of the sluiceways will be removed, the sluiceways being thus correspondingly shortened, and so allow the tailings or refuse to be freely dumped until the pile again approaches the end of the sluiceway, when a further section will be removed, and this operation will continue until the piles of tailings or refuse near the tower and until the sluiceway-sections have been successively removed. Hence it will be seen that as the shovels D excavate the earth along lines radiating from the tower and beneath the cableways C and C' the tailings or refuse will be dumped in corresponding linear piles at the opposite side of the tower. In this way the tailings or refuse can be economically and conveniently disposed of and without danger of filling up the stream or water-course near which the mining operations may occur.

In Fig. 18 of the drawings I have illustrated by the darkened section $y$ the divergent lines upon which the first excavations will occur, and by the darkened sections $z\ z$ I have indicated the divergent lines upon which the first piles of tailings or refuse will be made. When the excavations have proceeded along the channels $y\ y$ as far outward as convenient, the cableways C C' and the sluiceways E E' will be shifted, preferably, in the following manner: To one end of the rope or chain $8^a$, that passes around the sheaves of the block-and-tackle mechanism 8, will be attached a cable 16, that will lead to one of the winding-drums of the engine, and from the other winding-drum of the engine will lead a similar cable 17, that will be attached to the rope or chain $12^a$ of the block-and-tackle mechanism 12. The ropes of the block-and-tackle mechanism 6 and 14 (see Fig. 18) will then be slackened and the winding-drums of the engine will be put in operation, causing the cables 16 and 17 to be wound in, thereby bringing the outer ends of the cableways C and C' and the outer ends of the sluiceways E and E' closer together. By dotted lines in Fig. 18 I have indicated the new position that will be thus given to the cableways C and C' and to the sluice-cables E and E', and it will be seen that when the cableways and sluice-cables are thus shifted the method of excavation and the method of disposing of the tailings or refuse will proceed in manner hereinbefore described. As soon as the cableways C and C' and the sluice-cables E and E' have been thus shifted the adjustable clamps 9 and 13 will be removed (the ends of the cableways C and C' and E and E' being temporarily fastened together by turnbuckles or the like) and the block-and-tackle mechanism 8 will be extended and the clamps 9 and 13 again set in position upon the cableways C and C' and sluice-cables E and E' in readiness to permit these cables to be again shifted. When the cableways have been shifted to the second position, it will be seen that the earth will be excavated upon subjacent lines, as indicated in Fig. 18, and the tailings or refuse will be piled beneath the sluice-cables in manner hereinbefore described. The shift of the cables will thus occur from time to time until the segment of earth that is included between the cableways has been excavated, after which the cableways and the sluice-cables will be set over new segments of earth and the operation above described will be repeated. By mounting the tower so that it can be revolved it will be readily seen that this shifting of the cableways and sluice-cables to permit them to be extended over new segments can be readily accomplished.

It is manifest that the apparatus as thus far described may be used in other manner than that above indicated or that my method of effecting the excavations of the earth and the disposition of the tailings or refuse may be accomplished by other apparatus. So far as I am aware, however, my invention presents the first instance in which it has been proposed to excavate earth by extending divergent cable-ways from a tower or the like and moving said cable-ways with respect to each other by successive shifts and excavating the earth in lines radiating from a tower in correspondence with successive shifts of the cableways; and so, also, so far as I am aware, my invention presents the first instance in which the tailings or refuse has been disposed of by extending divergent sluice-cables from point of discharge and as the refuse piles approach said point of discharge shifting the said sluice-cables with respect to each other. So, also, I believe that my invention exhibits the first instance in which it has been proposed to discharge tailings or refuse from a sectional sluiceway suspended from a cable, the outer sections of the sluiceway being successively removed as the piles of tailings or refuse accumulate.

Figures 3, 4, 5, 6:
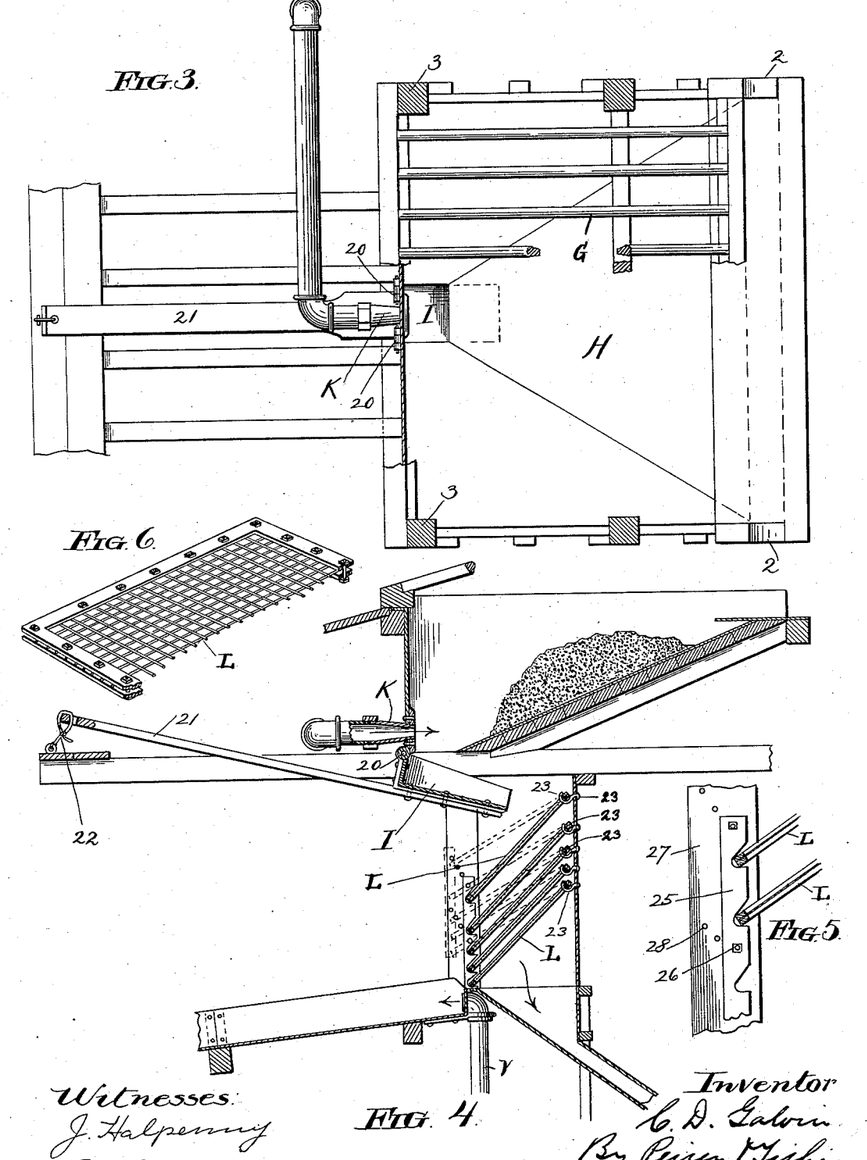
Fig. 3 is a plan view (parts being shown in section and parts being broken away) of the upper part of the tower above the delivery-hopper, this view being upon an enlarged scale.
Fig. 4 is a view in vertical section through the lower part of the delivery-hopper and the delivery-chute, screens, &c., immediately beneath it.
Fig. 5 is a detail view illustrating the means whereby the discharge end of the screens will be adjusted.
Fig. 6 is a detail perspective view of a portion of one of the screens.

As the shovels D deliver the earth to the top of the tower, suitable automatic tripping mechanism (which being old need not be specifically described) will there cause the load of the shovels D to be discharged upon an inclined grid or grating G, (see Figs. 1, 2, and 3,) that will serve to conduct away any large stones or the like and deliver the same to a chute G', down which they will pass to the subjacent sluiceway F. The earth passing through the grid or grating G will fall into the hopper H, the inclined bottom of which will direct the earth toward the chute or deflector I, that is located beneath the discharge-opening of the hopper H. The chute or deflector I, as clearly seen in Fig. 4 of the drawings, is pivoted, as at 20, to the main framework, and its angle of inclination can be adjusted by means of the rearward extension 21 and the rope 22. In this way the chute or deflector I can have its inclination varied in order to properly control the rate of discharge from the hopper H. At the bottom of the hopper H enters a water-supply nozzle K by which a stream of water will be directed into the bottom of the hopper, thereby causing the earth to pass from the hopper to the chute or deflector I, from which it will fall onto the subjacent screens L. The screens L will be arranged in desired or convenient number one above the other, the uppermost screen being of coarsest mesh, while the succeeding screens are of finer mesh. The upper ends of these screens L will be pivotally supported, as at 23, from the framework of the apparatus, in order to permit the lower ends of the screens to be raised or lowered in order to vary the angle of inclination of the screens, and thus properly control the delivery of the earth therethrough. Manifestly the same result might be obtained by pivoting the lower ends of the screens and vertically adjusting their upper ends. I prefer to effect the adjustment of the screens L by the simple mechanism illustrated in Fig. 5 of the drawings; that is to say, the lower ends of the screens L are set within notched side boards 25, that will be attached by pins 26 to the uprights 27 of the framework, these uprights being furnished with a series of holes 28, arranged in proper position and number to permit the adjustment of the screens to be secured.

Figures 7, 8, 9, 10:
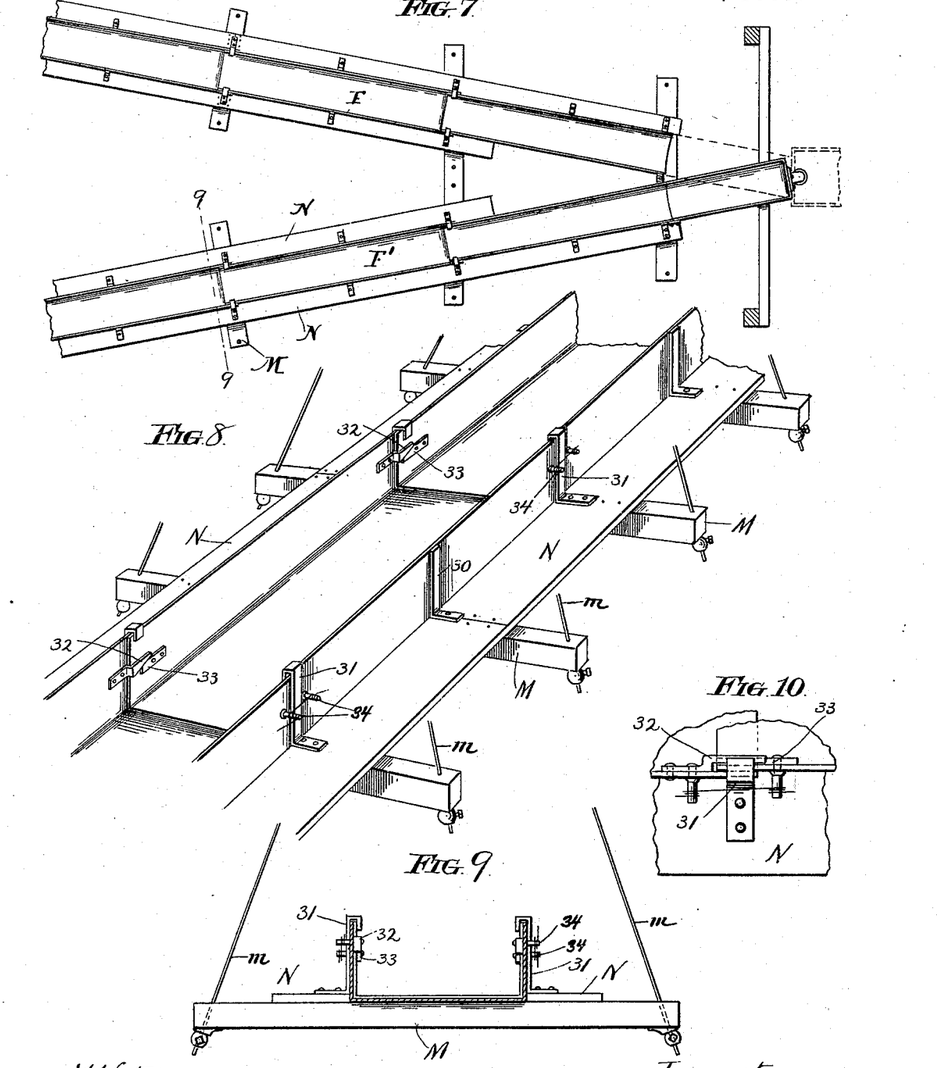
Fig. 7 is a detail plan view of two converging sluiceways that lead from the tower.
Fig. 8 is a perspective view, upon an enlarged scale, of a portion of one of the sectional sluiceways shown in Fig. 7.
Fig. 9 is a view in vertical cross-section through the sectional sluiceway.
Fig. 10 is a detail plan view showing the manner of joining the sections of the sluiceway.

It will be seen that the screens L are set at a slight distance apart and that while the finer portion of the earth passes eventually through the lowermost screen the gravel and like coarse material will discharge from the lower ends of the screens into the subjacent sluiceway, down which they will be carried by a suitably-delivered stream of water from pipe V. Preferably that part of the sluiceway immediately beneath or adjacent to the discharge end of the screens L is pivoted, as seen in Fig. 7, so that it may be swung opposite the sluiceways F or F', and thus cause the tailings and refuse to pass at will down either of these sluiceways.

The preferred construction of sluiceway is illustrated more particularly in Figs. 7 to 10 of the drawings; that is to say, each sluiceway F and F' is composed of sections, each section being preferably formed of sheet metal with upturned sides, the lower ends of the sections being somewhat narrower than the upper ends, so as to permit the sections to slightly enter each other and overlap, as shown. The sluiceway-sections are sustained by cross-bars M, to the outer ends of which connect the stirrups $m$, that hang from the sluice-cables E and E', and upon these crossbars M rest the planks N, that form convenient passage-ways for the attendants to pass along the sluiceways in order to remove any obstructions that may accumulate therein and as well also to remove the sections as the piles of tailings or refuse accumulate. Preferably the planks N are provided with the brackets 30 and 31, the brackets 31 having reversely-bent upper ends that form guideways for the overlapping ends of the sluiceway-sections. (See Figs. 8, 9, and 10.) By preference also the sluiceway-sections will be provided with the reversely-inclined bars 32 and 33, (see Fig. 8,) which, as the sections are placed together, will cause them to snugly fit, and upon the outside of the sections pins 34 may project in order to enable the sections to be conveniently fastened together, as by wire loops or other familiar means.

Figure 11:
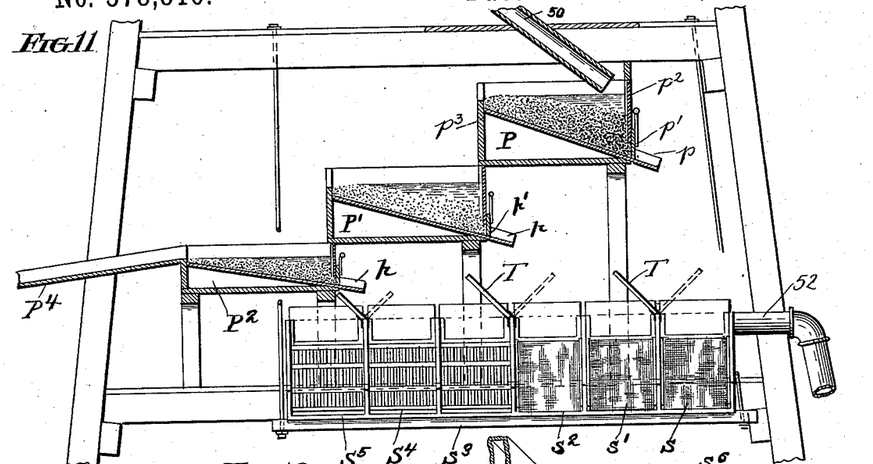
Fig. 11 is an enlarged view in vertical section through the settling-tanks above the engine-room of the tower.
Figure 12:
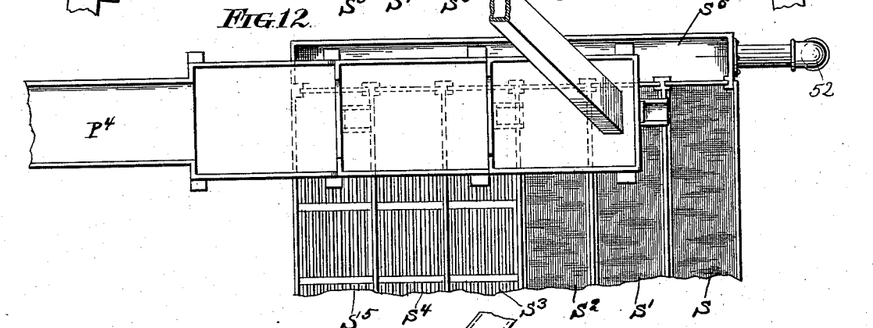
Fig. 12 is a plan view of the settling-tanks, &c., illustrated in Fig. 11.

The finer material that passes through the screens L will flow through the spout or chute 50 to the uppermost one of the settling-tanks P, P', and P². Each of these settling-tanks is provided with an inclined bottom, as shown, (see Figs. 1 and 11,) and at the deeper end is provided with a discharge-spout $p$, that is normally closed by a gate $p'$, provided with a handle 99. The end of each of the settling-tanks above the gate $p'$ is formed with a glass panel $p^2$, through which the height of the concentrate material within the tank can be conveniently gaged. The rear end $p^3$ of each of the settling-tanks is of less depth than the front ends or the sides, and over this rear end the material will flow from the tank P into the tank P', and thence into the subjacent tank P², and the final overflow from the settling-tanks will pass away by a discharge-sluice P⁴. By providing the tanks with inclined bottoms the heavier gold-bearing sand will settle at the front of the tanks and its condition can be readily seen through the sight-glass $p^2$, and in this manner the flow of material into the tanks can be determined.

Figures 13, 14:
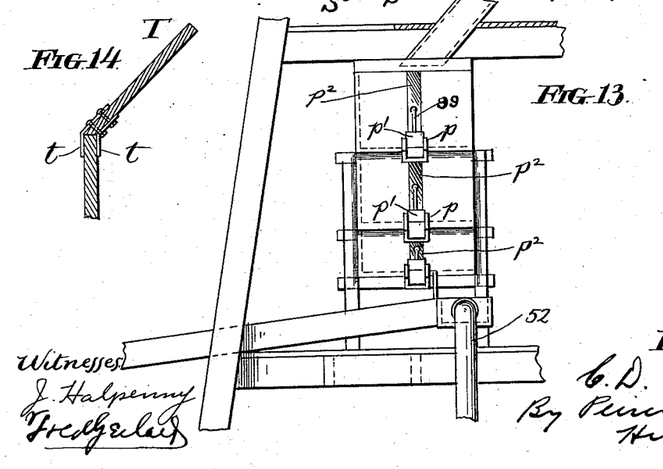
Fig. 13 is an end view of the parts shown in Figs. 11 and 12.
Fig. 14 is a detail view in section showing one of the reversible delivery-plates illustrated in Fig. 11.

Beneath the tanks P, P', and P² are arranged a series of inclined troughs S S' S² S³ S⁴ S⁵, and the upper ends of these troughs are preferably connected by the common flushing-trough S⁶, into which water is delivered by a supply-pipe 52. Upon the upper edges of the troughs S S', &c., will be mounted the inclined delivery plates or boards T, and by means of these boards or plates the material discharged from any one of these settling-tanks P P' P² can be caused to flow into either of two of the subjacent troughs. Thus it will be seen by reference to Fig. 11 that if the delivery-plates T are in the position there shown, then the material discharged from the settling-tanks will pass into the troughs S, S², and S⁴, whereas if the delivery-plates T are shifted to the reverse position shown by dotted lines, Fig. 11, the discharge from the tanks P, P', and P² will be into the troughs S', S³, and S⁵. Any convenient means may be employed for effecting the reversal of the delivery-plates T, although I prefer to provide the bottoms of these plates with guide-irons $t$, adapted to set over the edges of the troughs, as shown more particularly in Fig. 14.

The sluices S, S', and S² are shown as having their bottoms covered with "burlap" or like material for catching the gold, while the sluices S³, S⁴, and S⁵ are shown as having their bottoms provided with vertical and transverse slats forming "riffles" for arresting the gold, and in these riffles mercury may be placed. Then the amalgamation process is to be practiced.

It will be seen that by lifting the gates $p'$ of the several tanks $p$, $p'$, and $p^2$ to the proper extent the weight and discharge of the material from the several tanks can be accurately determined, the concentrate material flowing through the spouts $p$ of the tanks to the tanks below.

It will be understood, of course, that the details of construction above set out may be varied without departing from the spirit of the invention, and that features of the invention may be employed without its adoption as an entirety.

Having thus described the invention, what I claim as new, and desire to secure by Letters Patent, is—

1. In apparatus of the character described, the combination with a tower, of divergent cableways extending from said tower the outer ends of said cableways being connected together and suitable anchors for retaining said cableways apart, substantially as described.

2. In apparatus of the character described, the combination with a tower, of divergent cableways, the outer ends of which are connected by block-and-tackle mechanism, and suitable anchors for retaining said cableways in position, substantially as described.

3. In apparatus of the character described, the combination with a tower, of divergent cableways extending from one side of said tower and divergent sluice-cables extending from the opposite side of said tower and sluices carried by said sluice-cables, substantially as described.

4. In apparatus of the character described, the combination with a tower, of a sluice-cable and a sluiceway suspended therefrom and formed of detachable sections, substantially as described.

5. In apparatus of the character described, the combination with a tower, of a sluice-cable extending therefrom, a sluiceway suspended from said cable and formed of sections having interlocking ends, substantially as described.

6. In apparatus of the character described, the combination with a tower, of a sluice-cable extending therefrom, a sluiceway suspended from said cable and formed of sections, one section of said sluiceway being adapted to fit into the next adjoining section, substantially as described.

7. In apparatus of the character described, the combination with a tower, of a sluice-cable extending therefrom, a series of stirrups depending from said cable and a sectional sluiceway sustained by said stirrups, substantially as described.

8. In apparatus of the character described, the combination with a tower, of a sluice-cable extending therefrom, stirrups depending from said cable, cross-beams at the lower ends of said stirrups, a sectional sluiceway resting upon said cross-beams and side boards extending between said cross-beams adjacent said sluiceway, substantially as described.

9. In apparatus of the character described, the combination with a tower, of divergent sluice-cables extending therefrom, suitable anchors for retaining the outer portions of said cables at a distance apart, the ends of said cables being connected together and sluiceways suspended from said cables, substantially as described.

10. In apparatus of the character described, the combination with a tower, of sluice-cables extending therefrom, sluiceways suspended from said cable and a shifting spout adjacent the tower and adapted to direct the refuse or tailings into either of said sluiceways, substantially as described.

11. In apparatus of the character described, the combination with a tower having a hopper in its upper portion, of an adjustable chute beneath the discharge end of said hopper and a screen beneath said chute, and inclined oppositely thereto substantially as described.

CARROLL D. GALVIN.

Witnesses:
GEO. P. FISHER, Jr.,
ALBERTA ADAMICK.